(12) United States Patent
Chen

(10) Patent No.: US 6,938,304 B2
(45) Date of Patent: Sep. 6, 2005

(54) MULTI-FUNCTION CLAMP

(75) Inventor: Jason Chen, Marlton, NJ (US)

(73) Assignee: Impex International, Inc., Marlton, NJ (US)

( * ) Notice: Subject to any disclaimer, the term of this patent is extended or adjusted under 35 U.S.C. 154(b) by 5 days.

(21) Appl. No.: 10/702,559

(22) Filed: Nov. 7, 2003

(65) Prior Publication Data

US 2005/0097709 A1 May 12, 2005

(51) Int. Cl.$^7$ ............................................. A44B 21/00
(52) U.S. Cl. ......................................... 24/3.12; 24/3.3
(58) Field of Search ...................... 24/3.12, 3.11, 10 R, 24/11 P, 3.3; 248/902

(56) References Cited

U.S. PATENT DOCUMENTS

| | | |
|---|---|---|
| 6,210,003 B1 | 4/2001 | Chan |
| 6,564,432 B1 * | 5/2003 | Kushner ........................ 24/3.3 |
| 6,691,374 B2 * | 2/2004 | Coyne ......................... 24/3.12 |
| 6,728,995 B2 * | 5/2004 | Ainley et al. ................. 24/3.3 |
| 2002/0010983 A1 * | 1/2002 | Lee ............................. 24/3.12 |
| 2004/0045133 A1 * | 3/2004 | Buettell ..................... 24/3.12 |

* cited by examiner

Primary Examiner—Robert J. Sandy
(74) Attorney, Agent, or Firm—Rabin & Berdo, P.C.

(57) ABSTRACT

A multi-function clamp has a base plate, a connecting seat connected to the base plate, a pressing seat integrally formed with the connecting seat, an outer cover pivotally connected to the base plate and a rear clip securely engaged with the base plate. Multiple soft pads are securely sandwiched between the base plate and the outer cover to function as shock absorber. Spacers are formed on a rear face of the base plate to keep a distance to the rear clip. Hemispheres are formed on the rear clip to engage with the rear face of the base plate to clamp an object with the rear face of the base plate.

13 Claims, 6 Drawing Sheets

MULTI-FUNCTION CLAMP

BACKGROUND OF THE INVENTION

1. Field of the Invention

The present invention relates to a clamp, and more particularly to a multi-function clamp that can clamp a piece of paper, a pen and even a pair of eyeglasses. Furthermore, a stop mechanism is provided to the clamp so that when the clamp holds a pair of eyeglasses, the stop mechanism prevents the eyeglasses from falling off the clamp.

2. Description of Related Art

A conventional clamp normally is specially designed for a particular object and thus the clamp can only clamp the particular object, which clamp is quite nice and handy. However, when it comes to different objects, the clamp is useless and the only thing the clamp can achieve is to occupy a space.

U.S. Pat. No. 6,210,003 discloses a clamp with a top cap, a bottom seat and an elastic retainer. A soft pad provided to the inner face of the top cap has an opening and a hook formed on a top portion defining the opening. A pair of lugs is provided on a bottom portion defining the opening. The bottom seat has a soft pad securely mounted on an inner face of the bottom seat, a pair of bosses formed on a front portion of the bottom seat and each boss having a press formed on a distal end of the boss. The elastic retainer is sandwiched between the top cap and the bottom seat to hold a pair of eyeglasses. Unfortunately, the clamp can only clamp a specific object, and in case of clamping a pair of eyeglasses, there is no stop mechanism provided to the clamp such that when the top cap is pivoted for access to the eyeglasses, the eyeglasses may fall off the clamp easily.

To overcome the shortcomings, the present invention intends to provide an improved multi-function clamp, which is able to clamp a piece of paper, a pen or even a pair of eyeglasses.

SUMMARY OF THE INVENTION

The primary objective of the invention is to provide a multi-function clamp having a base plate, a connecting seat securely connected to the base plate, a pressing seat integrally formed with the connecting seat, an outer cover pivotally connected to the base plate to selectively connected to the connecting seat, a rear clip securely mounted with the base plate and soft pads securely received between the outer cover and the base plate as a shock absorber to protect the object clamped between the base plate and the outer cover.

Other objects, advantages and novel features of the invention will become more apparent from the following detailed description when taken in conjunction with the accompanying drawings.

DETAILED DESCRIPTION OF THE PREFERRED EMBODIMENTS

Figure 1:
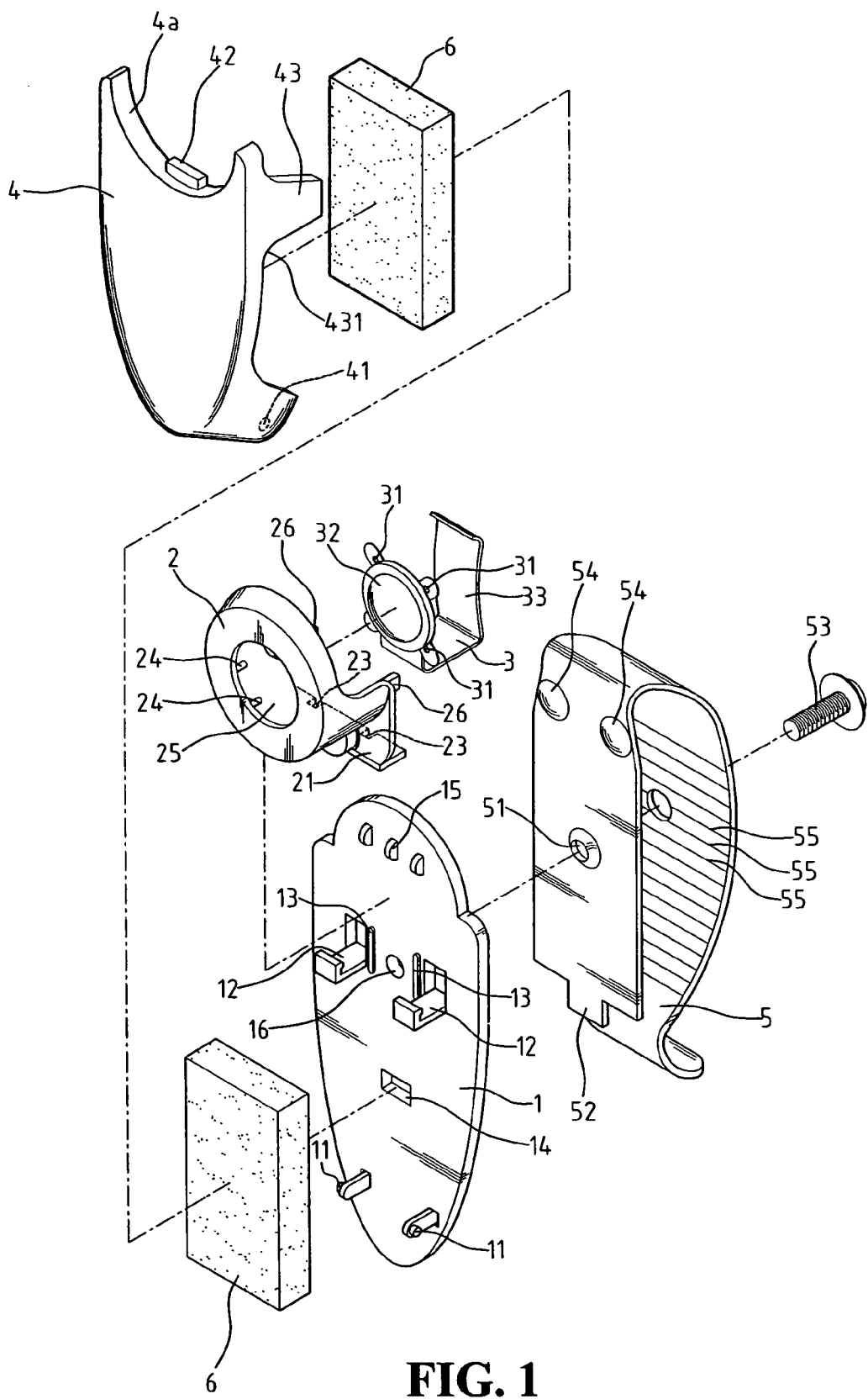
FIG. 1 is an exploded perspective view of a clamp of the present invention.

With reference to FIG. 1, a multi-function clamp in accordance with the present invention has a base plate 1, a connecting seat 2 securely connected to the base plate 1, a pressing seat 3 integrally formed with the connecting seat 2, an outer cover 4 pivotally connected to the base plate 1 to selectively connect to the connecting seat 2, a rear clip 5 securely mounted with the base plate 1 and soft pads 6 securely received between the outer cover 4 and the base plate 1 as a shock absorber to protect the object clamped between the base plate 1 and the outer cover 4.

Figure 3:
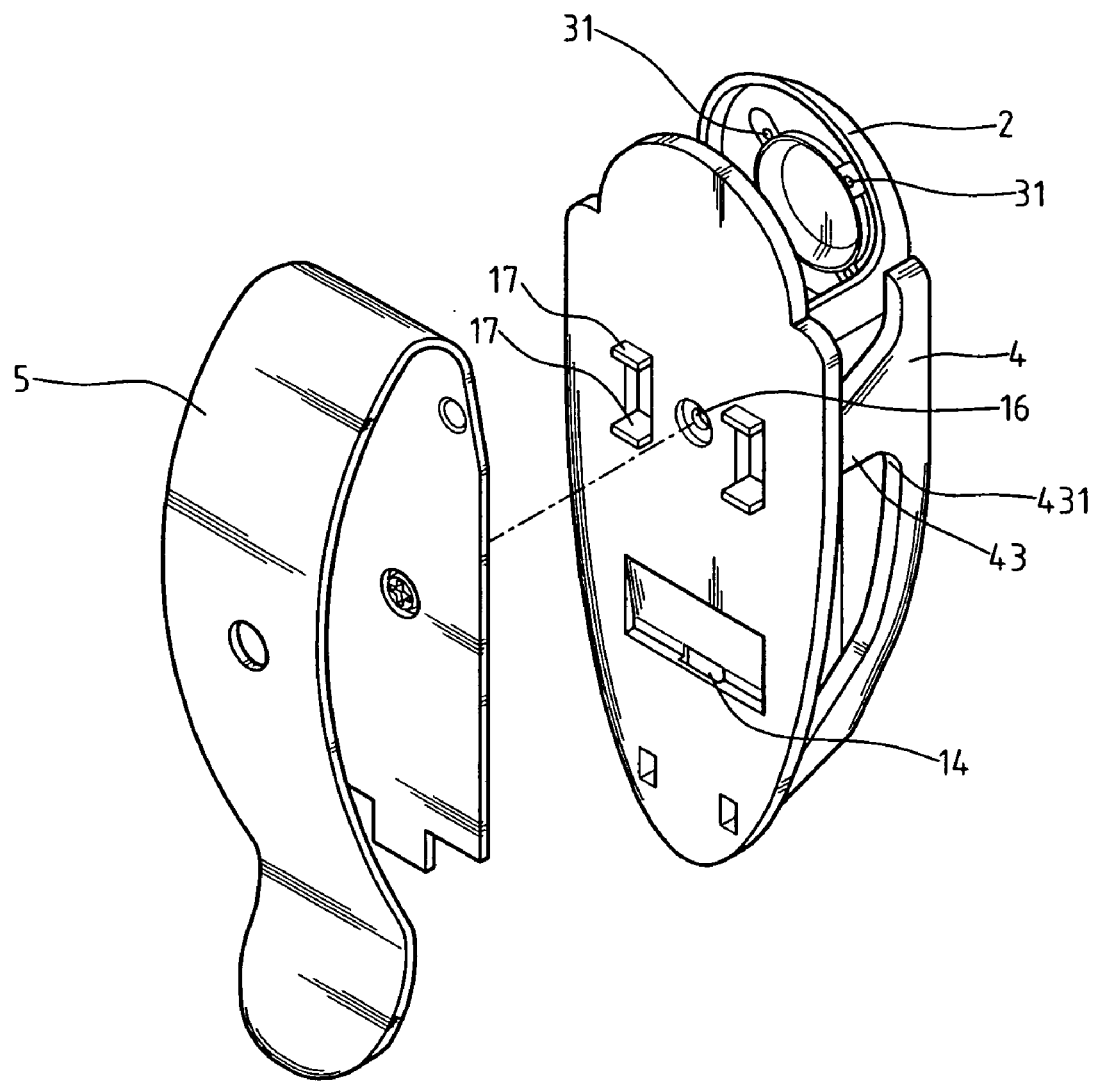
FIG. 3 is an exploded perspective view showing another preferred embodiment of the clamp of the present invention.

The base plate 1 has a pair of pins 11 oppositely formed on a bottom portion of the base plate 1, a pair of L-shaped supports 12 extending out from a mediate portion of the base plate 1, a pair of protruded guiding tracks 13 oppositely formed between the pair of supports 12, an insertion hole 14 defined between the pair of L-shaped supports 12 and the pair of pins 11, multiple bosses 15 formed on a top portion of the base plate 11, a connection hole 16 defined between the pair of guiding tracks 13 and two pairs of spacers 17 formed on a rear face of the base plate 1 to engage with a face of the rear clip 5 such that the base plate 1 is kept a distance from the rear clip and thus the rear clip 5 is maintained its resilience when required, as shown in FIG. 3.

The connecting seat 2 has a pair of bases 21 oppositely formed to correspond to the L-shaped supports 12 so that the two bases 21 are able to be snugly received and supported by the L-shaped supports 12, an opening 22 defined between the two bases 21, a pair of passages 23 respectively defined in a side face of the base 21 to correspond to the guiding tracks 13 such that the connecting seat 2 is able to combine with the base plate 1 by inserting the two guiding tracks 13 into the corresponding passages 23 until the two bases 21 are supported and received in the corresponding L-shaped supports 12, multiple bosses 24 formed on a periphery defining a through hole 25 in the connecting seat 2, two supports 26 spaced apart from each other and formed on an inner face of the connecting seat 2 to engage with the base plate 1 and a hole 27 (shown in FIG. 2) defined in the connecting seat 2 to correspond to the connection hole 16 of the base plate 1.

Preferably, the pressing seat 3 has multiple extensions (not labeled) each forming a combining hole 31 defined in correspondence to one of the bosses 24 of the connecting seat 2 so that after the bosses 24 are inserted into the corresponding combining holes 31, supersonic welding is applied to securely combine the connecting seat 2 with the pressing seat 3, a dome 32 integrally formed with the pressing seat 3 and having the extensions formed around a periphery of the dome 32, wherein the dome 32 corresponds to the through hole 25 such that when the bosses 24 are welded to the extensions, the dome 32 is rested in the through hole 25 of the connecting seat 2. A blocking plate 33 is integrally formed with the pressing seat 3 and extending upright relative to the pressing seat 3.

Figure 2:
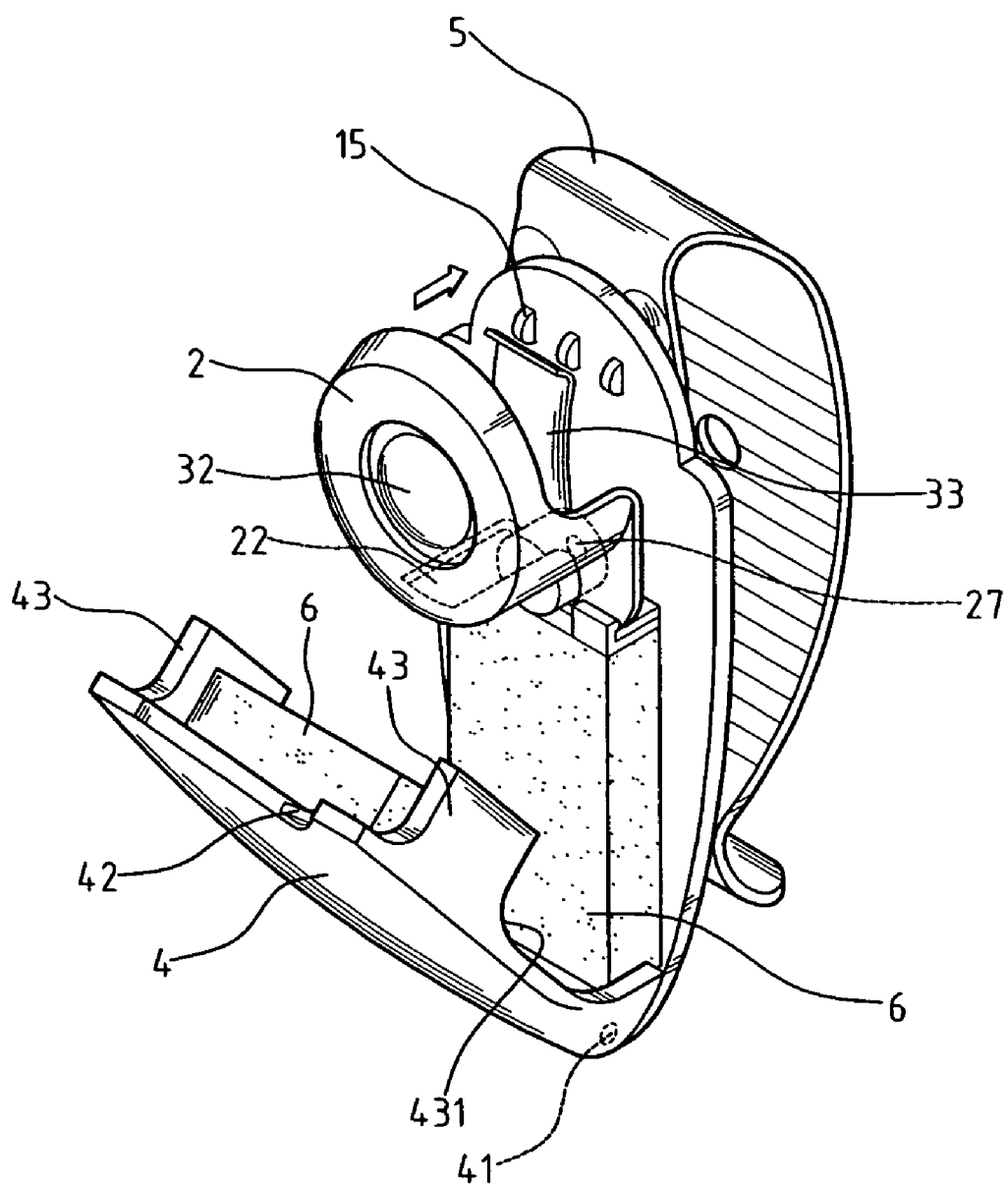
FIG. 2 is a perspective view showing the clamp of the present invention after assembled.

The outer cover 4 has two pin holes 41 oppositely formed to correspond to the pins 11 of the base plate 1 so that after the two pins 11 are inserted into the corresponding pin holes 41, the outer cover 4 is able to pivot relative to the base plate 1, an insertion 42 formed on a curved top portion 4a of the outer cover 4 to correspond to the opening 22 (as shown in FIG. 2) to allow the insertion 42 to extend into the corresponding opening 22 of the connecting seat 2 when the outer cover 4 is pivoted toward the base plate 1 and two arms 43 oppositely extending out from the outer cover 4 and each having a cutout 431 defined at a joint between the arm 43 and the outer cover 4 to function as a stop mechanism.

The rear clip 5 has an aperture 51 defined to correspond to the connection hole 16 of the base plate 1 and the hole 27 of the connecting seat 2 to allow a securing element 53, preferably a threaded bolt, to extend into the aperture 51, the connection hole 16 and into the hole 27 of the connecting seat 2 to combine the rear clip, the base plate 1 and the connecting seat 2, a tongue 52 formed on a bottom face of the rear clip 5 to correspond to the insertion hole 14 of the base plate 1 so that after the tongue 52 is inserted into the insertion hole 14, the connection between the rear clip 5 and the base plate 1 is enhanced, hemispheres 54 formed on a top portion of the rear clip to engage with a face of the base plate 1 and multiple slip-proof strips 55 formed on an inner face of the rear clip 5. Preferably, there are two soft pads 6 sandwiched between the base plate 1 and the outer cover 4, wherein one soft pad 6 is securely attached to a face of the base plate 1 and the other soft pad 6 is securely attached to a face of the outer cover 4 to function as a shock absorber.

After the clamp of the present invention is assembled as previously described, the outer cover 4 is able to pivot relative to the base plate 1. Further, as shown in FIG. 3, the spacers 17 formed on the rear face of the base plate 1 engaged with the face of the rear clip 5 to maintain the resilience of the rear clip 5 such that when the rear clip 5 together with the base plate 1, the connecting seat 2, the pressing seat 3, the outer cover 4 and the pads 6 is hung on the operator's belt, the rear clip 5 is able to have sufficient resilience.

Figure 4:
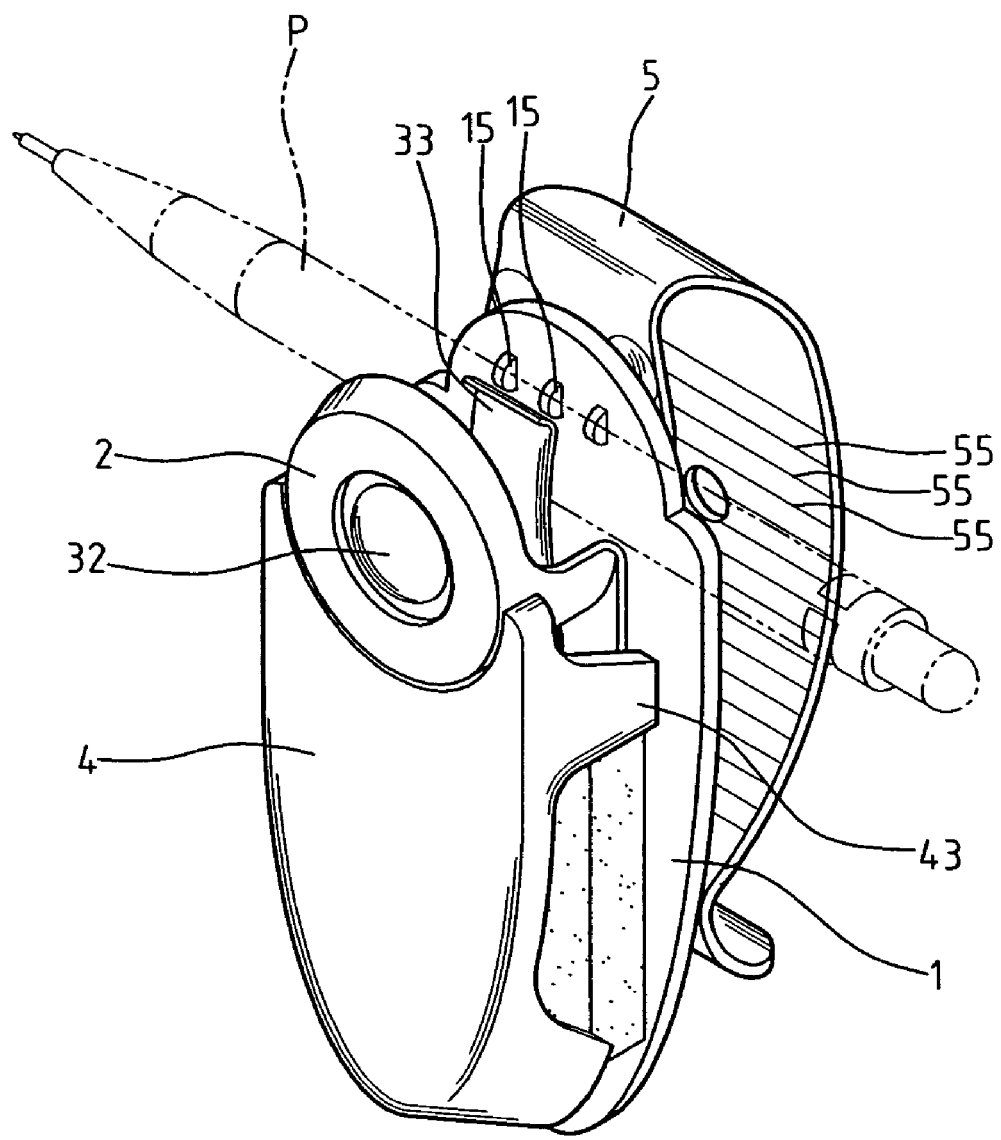
FIG. 4 is a perspective view showing the clamp of the present invention clamping a pen.
Figure 5:
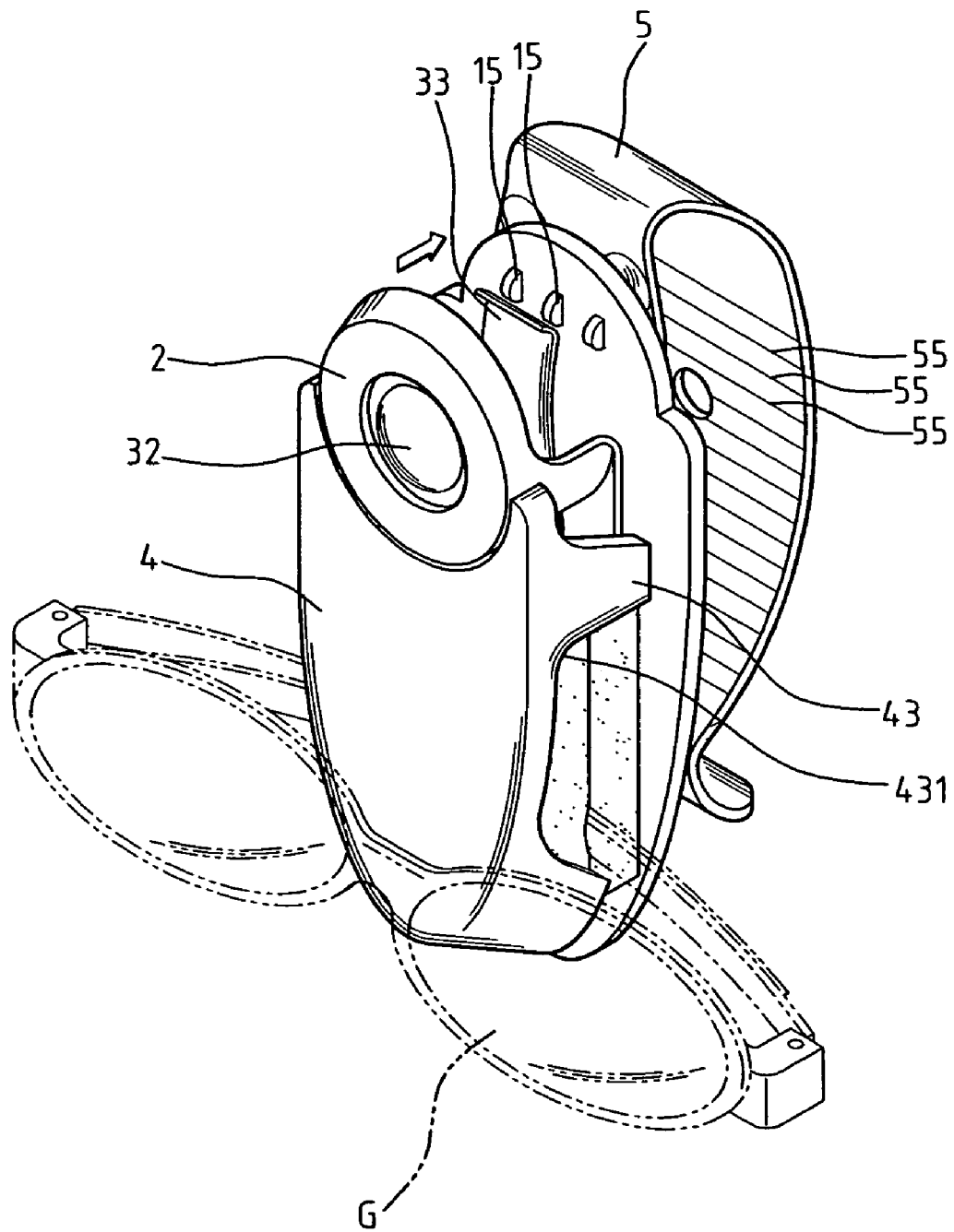
FIG. 5 is a perspective view showing the clamp of the present invention clamping a pair of eyeglasses.
Figure 6:
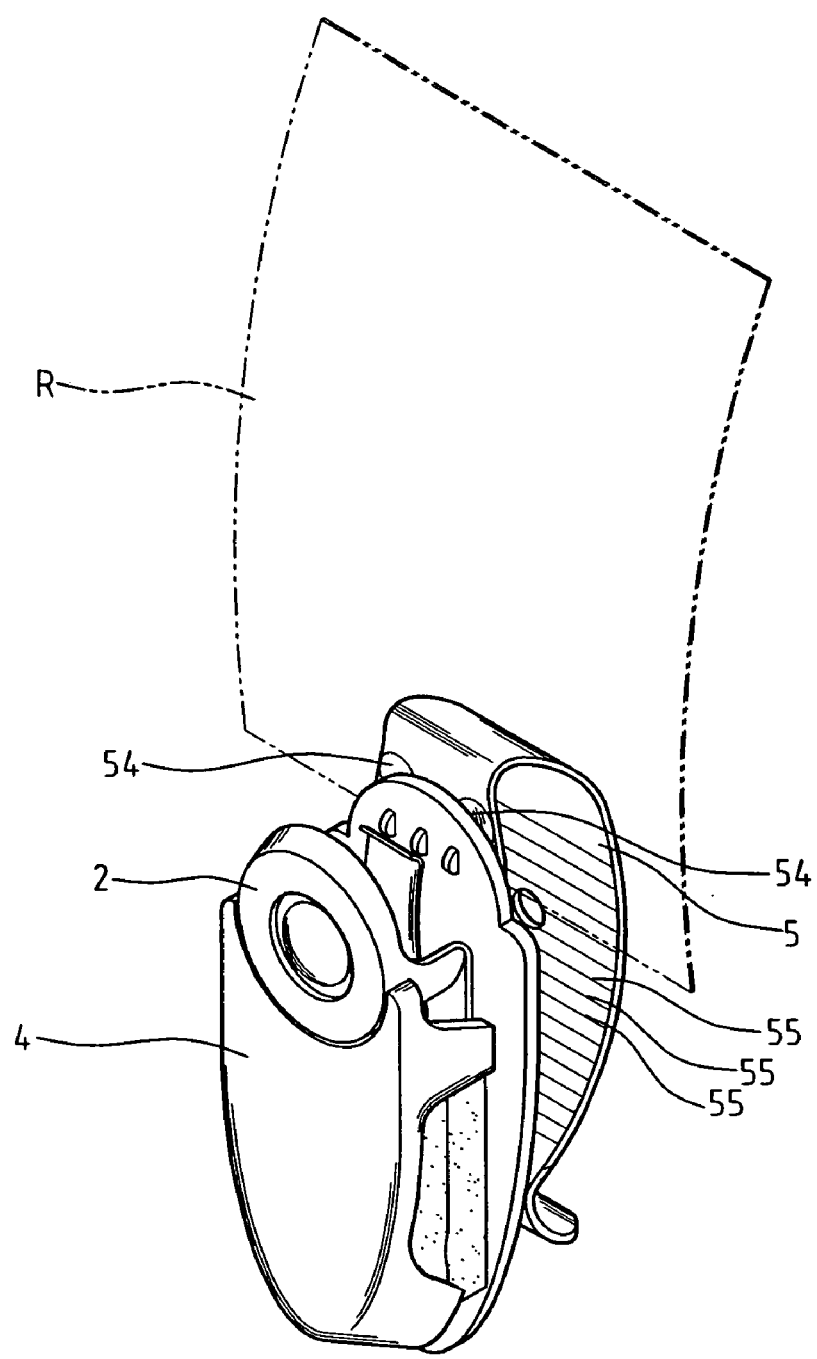
FIG. 6 is a perspective view showing the clamp of the present invention clamping a piece of paper.

With reference to FIG. 4, with the co-operation of the blocking plate 33 and the bosses 15 of the base plate 1, the clamp of the present invention is able to clamp a pen P. With reference to FIG. 5, if the outer cover 4 is pivoted away from the base plate 1, the operator is able o place a pair of eyeglasses G between the outer cover 4 and the base plate 1. After the outer cover 4 is pivoted toward the base plate 1 and eventually connected to the connecting seat 2 by inserting the insertion 42 into the corresponding opening 22, the eyeglasses G is securely sandwiched between the base plate 1 and the outer cover 4. Moreover, if the eyeglasses G is to be retrieved, the outer cover 4 is first pivoted away from the base plate 1 and eventually the eyeglasses G is revealed. However, due to the provision of the cutouts 431 of the arms 43, the eyeglasses G is prevented from falling and thus the eyeglasses G is protected from damage even the clamp of the present invention is hung on the sun blind in a vehicle by the rear clip 5. With reference to FIG. 6, with the spacers 17, the rear clip 5 is kept away from engagement with the base plate 1 except the domes 54 such that a piece of paper R is clamped by the co-operation of the domes 54 and the rear face of the base plate 1. Further, the slip-proof strips 55 able to secure the position of the clamp when the clamp is hung on the operator's belt.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A multi-function clamp comprising:
 a base plate having two pins oppositely formed on the base plate and two L-shaped supports extending out from the base plate;
 a connecting seat having two bases corresponding to and received in the two L-shaped supports and an opening defined in the connecting seat;
 a pressing seat integrally formed with the connecting seat and having a dome formed to be received in a through hole defined in the connecting seat and a blocking plate extending upright relative to the pressing seat;
 an outer cover having two pin holes defined to correspond to the two pins to allow the two pins to extend into the two pin holes to be pivotable relative to the base plate and an insertion formed on a curved top portion of the outer cover to correspond to the opening of the connecting plate such that after the insertion is inserted into the opening, the outer cover is connected to the connecting plate when the outer cover is pivoted toward the base plate; and
 a rear clip securely connected to a rear face of the base plate.

2. The clamp as claimed in claim 1, wherein the rear clip has an aperture corresponding to a connection hole of the base plate such that a securing element is able to extend into the aperture and the connection hole to secure engagement between the rear clip and the base plate.

3. The clamp as claimed in claim 2 further comprising multiple soft pads securely sandwiched between the outer cover and the base plate.

4. The clamp as claimed in claim 3, wherein the base plate has two guiding tracks defined between the two L-shaped supports to correspond to two passages respectively defined in a side face of each base of the pressing seat such that the connecting seat is able to engage with the base plate by inserting the two guiding tracks into the two corresponding passages until the two bases are supported and received in the two L-shaped supports.

5. The clamp as claimed in claim 4, wherein the base plate has an insertion hole defined to correspond to a tongue formed on a bottom of the rear clip such that after the tongue is inserted into the corresponding insertion hole, engagement between the base and the rear clip is enhanced.

6. The clamp as claimed in claim 5, wherein the base plate further has multiple bosses formed on a top portion of the base plate to co-operate with the blocking plate whereby an object is selectively secured by the blocking plate and the bosses.

7. The clamp as claimed in claim 6, wherein the base plate has multiple spacers formed on the rear face of the base plate to abut a face of the rear clip such that after the engagement between the base plate and the rear clip is accomplished, a distance is still kept therebetween.

8. The clamp as claimed in claim 7, wherein the pressing seat has multiple extensions each with a combining hole and the connecting seat has multiple second bosses formed around a periphery defining the through hole to correspond to the combining holes such that after the second bosses are inserted into the combining holes, engagement between the connecting seat and the pressing seat is accomplished.

9. The clamp as claimed in claim 8, wherein the connecting seat has multiple supports on an inner face of the connecting seat to engage with the base plate.

10. The clamp as claimed in claim 9, wherein the connecting seat has a hole corresponding to the connection hole such that the securing element is able to extend into the hole to secure the connecting seat with combination of the base plate and the rear clip.

11. The clamp as claimed in claim 10, wherein the rear clip has two hemispheres formed on a top portion of the rear clip to engage with the base plate.

12. The clamp as claimed in claim 11, wherein the rear clip has multiple slip-proof strips formed on an inner face of the rear clip.

13. The clamp as claimed in claim 12, wherein the outer cover has two arms extending outward from the outer cover, each arm having a cutout defined at a joint of the arm and the outer cover to prevent falling of the object sandwiched between the outer cover and the base plate when the outer cover is pivoted away from the base plate.

\* \* \* \* \*

UNITED STATES PATENT AND TRADEMARK OFFICE
CERTIFICATE OF CORRECTION

PATENT NO.     : 6,938,304 B2
DATED          : September 6, 2005
INVENTOR(S)    : Jason Chen It is certified that error appears in the above-identified patent and that said Letters Patent is hereby corrected as shown below:

Column 4,
Lines 18 and 20, after "connecting", change "plate" to -- seat --.

Signed and Sealed this

Second Day of May, 2006

JON W. DUDAS
*Director of the United States Patent and Trademark Office*